March 28, 1939.  V. W. KLIESRATH  2,152,059
CLUTCH OPERATING MECHANISM
Filed May 29, 1931
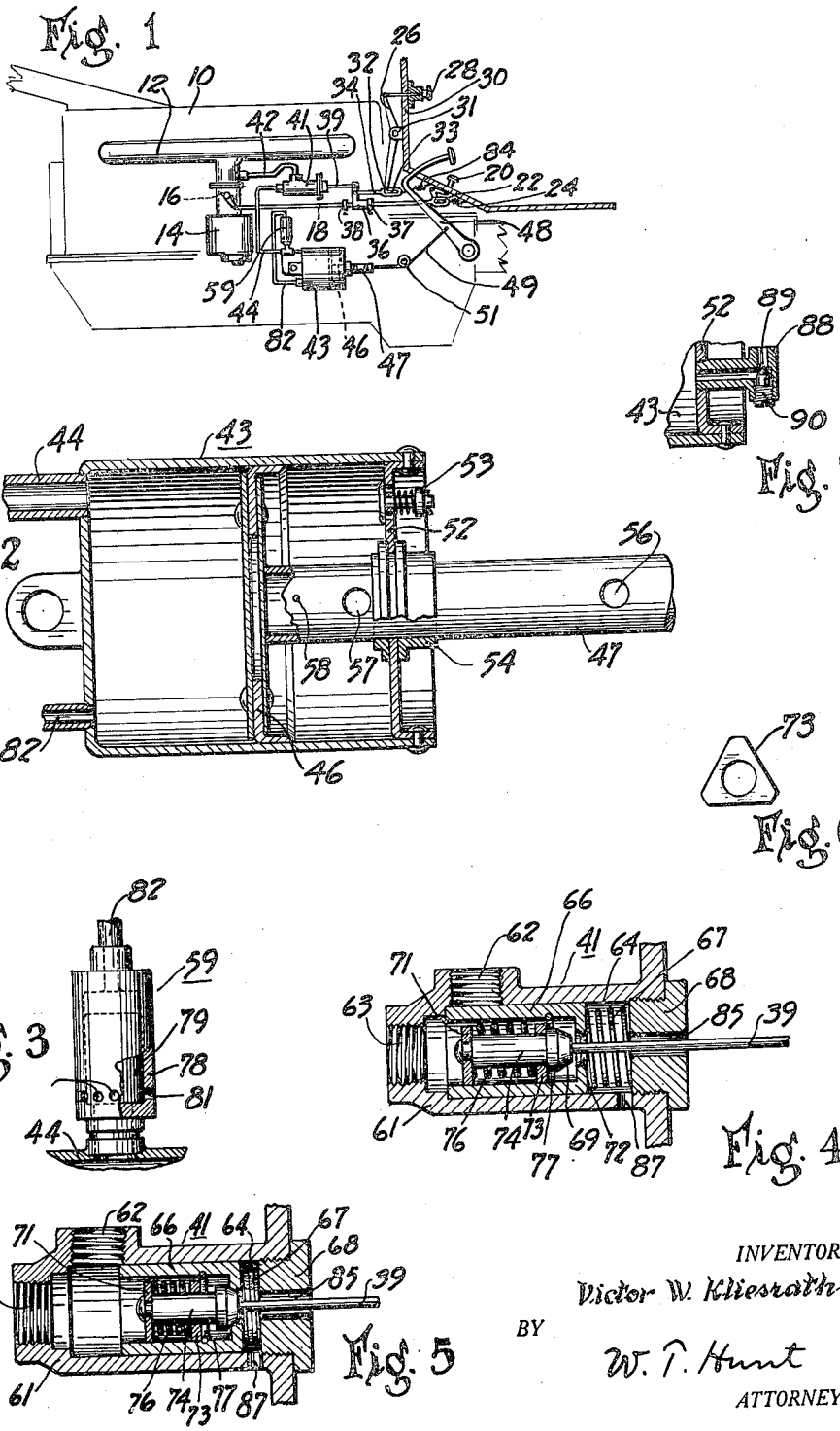
INVENTOR.
Victor W. Kliesrath
BY
W. T. Hunt
ATTORNEY.

Patented Mar. 28, 1939

2,152,059

UNITED STATES PATENT OFFICE 2,152,059

CLUTCH OPERATING MECHANISM

Victor W. Kliesrath, South Bend, Ind., assignor to Bragg Kliesrath Corporation, Long Island City, N. Y., a corporation of New York Application May 29, 1931, Serial No. 540,827

6 Claims. (Cl. 192—.01)

This invention relates to automatic controls for vehicles, and is illustrated as embodied in a vacuum controlled clutch.

It is commonly known that automobile engines, as usually connected to the wheels, act to drive the vehicle under certain conditions, and as braking or retarding devices under other conditions. For example, when the vehicle is travelling at a high rate of speed and the throttle is suddenly closed, the closing of the throttle causes the engine to exert a retarding force and the action is similar to a brake application. Stating the matter in another way, for each given load and throttle opening, there is a definite vehicle speed and when the throttle position is changed, the engine acts to raise or lower the speed to the normal corresponding to that position. Advantage of the inherent braking force of the engine is often taken in mountainous country and the engine is used as a brake to reduce the vehicle speed, but there is now a growing tendency to incorporate devices which allow the vehicle to overrun the engine and to freely coast when the engine speed is reduced below that corresponding to the vehicle speed. This overrunning action is usually termed free-wheeling and is very desirable in open or level country driving, for with vehicles equipped with free-wheeling devices, the engine does not act as a drag on the vehicle when the throttle is closed and the fuel consumption is notably reduced.

Various devices, such as roller clutches and the like have been suggested to provide free-wheeling, but these devices are in the nature of additions or accessories to the regular power plant and in the present invention, I propose to use the conventional clutch as a free-wheeling device and to automatically control it by engine suction in a manner to disengage the clutch when the vacuum within the engine manifold is increased during the normal idling or slow speed operation of the engine, and to automatically engage the clutch quickly and smoothly when the throttle is opened sufficiently to cause the engine to drive the vehicle.

An important feature of the present invention relates to the control valve for operating the vacuum throw-out device for the clutch and which preferably is connected to the ordinary foot accelerating pedal.

In one desirable arrangement the control valve is interconnected with both the hand operated throttle lever and the foot accelerator but in a manner to give different operations, depending upon which control is used. In a preferred arrangement, the foot accelerator connection is arranged to control the valve for automatic operation of the clutch and the hand throttle lever is arranged to throw the valve to the inoperative position during the initial movement of the lever, just prior to the movement of the throttle valve.

An object of the invention is to provide an automatic vehicle in which some part of the drive mechanism, such as the clutch, is operated automatically.

Another object of the invention is to provide a vehicle with a clutch which may be disengaged during the normal idling of the engine.

Another object of the invention is to provide a free-wheeling vehicle.

Another object of the invention is to provide an automatic clutch which may be quickly disengaged and engaged with a smooth action.

Another object of the invention is to provide an automatic clutch which may be quickly disengaged and in which the movement of the friction parts is rapid until substantially actual contact occurs, and then slowed down to give a clutch action similar to manual operation.

Another object of the invention is to provide an automatic clutch which may be readily changed from automatic to manual operation.

Another object of the invention is to provide a clutch which is operated by engine suction in a manner to cause the vehicle to free-wheel when the engine throttle is closed.

Another object of the invention is to provide an automatic clutch which may be changed to a manually actuated one by movement of one of the regular engine controls.

Other objects and features which may be incident to the invention will be apparent from the following description in connection with which I have illustrated a preferred embodiment shown in the accompanying drawing in which:

Figure 1 is a side elevation of an engine illustrating the manner of arranging the controls for operating the clutch;

Figure 2 is an enlarged sectional view of the vacuum controlled clutch actuating device;

Figure 3 is a sectional view of a quick release valve for introducing atmospheric pressure into the cylinder from a point adjacent thereto;

Figure 4 is a sectional view illustrating the control valve in the position that it occupies during the time that the engine is driving the vehicle;

Figure 5 is a sectional view of the controlled valve illustrating its position during the idling of the engine;

Figure 6 is a detail view of one of the atmospheric valve guiding washers; and

Figure 7 is a fragmental view illustrating a modification of the atmospheric opening which controls the movement of the piston during the clutch engagement.

Referring to the drawing, 10 is an internal combustion engine having a manifold 12, a carburetor 14 within which is a throttle valve 16 controlled by rod 18, connected to the accelerator pedal 20 through a slotted link connection 22 and normally urged to the closed position by spring 24. Manual control of throttle valve 16 is secured by lever 26, adapted to be operated by hand button 28, the lever being pivotally mounted to the vehicle dash 30 at 31. The lower end of the lever is provided with a pin 32, slidable in slot 33, formed in rod 34, secured to a slidable member 36, mounted on rod 18 between the spaced collars 37 and 38, which are secured to the rod 18. A thrust wire 39 is also secured to slidable member 36 for operating the control valve generally designated as 41, which will be hereinafter described in detail, and shown in Figure 1 as connected to the intake manifold 12 by pipe 42 and to the cylinder 43 of the clutch operating device by pipe 44. Piston 46 has its shaft 47 connected to the usual clutch pedal 48 by a tension member 49 which may be a flexible cable guided by pulley 51. The clutch operating device includes cylinder 43, piston 46, and a closure plate 52 for the cylinder, having an inwardly opening check valve 53 and supporting a bearing 54 for the slidable hollow shaft 47. Holes 56 and 57 are provided in shaft 47 and preferably located so that hole 56 is always in communication with the atmosphere and 57 is in communication with the outer portion of cylinder 43 for a part of its movement.

A small calibrated hole 58 is also provided in shaft 47 for controlling the outflow of air from the right-hand side of piston 46 as viewed in Figure 2, during the latter part of the outward movement of the piston after the large outlet opening 57 has been covered by bearing 54. The cylinder portion at the left of piston 46, as viewed in Figure 2, is connected to the inlet manifold through pipe 44, having a quick release valve 59 mounted adjacent cylinder 43. The construction of control valve 41 is best shown in Figures 4 and 5, and includes a body portion 61 having a vacuum opening 62 adapted to be connected to pipe 42 and an opening 63 adapted to have a connection to cylinder 43 through pipe 44. The control valve is preferably formed with a cylindrical portion 64 within which is slidably mounted a sleeve 66 normally urged toward the left as viewed in Figure 4 by spring 67 coacting between the sleeve and closure plug 68. Within sleeve 66 is a valve 69, to which is secured control member 39 preferably formed of steel wire which serves as an actuating member for both valve 69 and sleeve 66.

At the outer end of valve 69 is secured washer 71 which may be triangular in form for permitting the passage of gases through opening 72, formed in the outer end of sleeve 66, and which opening may be closed by movement of valve 69. Washer 73 is slidably mounted upon stem 74 of valve 69 and spring 76 coacts between washers 71 and 73 for urging valve 69 toward its open position as shown in Figure 4, washer 73 being located against movement toward the right as viewed in Figure 4, by lock wire 77 which is sprung into an annular groove formed on the interior of sleeve 66.

Quick release valve 59 includes a cylinder 78 within which is slidably mounted a piston 79 adapted, when in its lower position, to close atmospheric openings 81. The cylinder space below the piston is in communication with vacuum pipe 44 and the cylinder space above the piston is in communication with the interior of cylinder 43 through pipe 82.

The operation of the device is as follows. In Figure 1, the parts are shown in the position they normally occupy when the engine is at rest, and control valve 41 is in the position shown in Figure 5. Upon starting of the engine, vacuum from the intake manifold 12 will be communicated to the cylinder 43 through pipe 42, openings 62 and 63, and pipe 44. The reduction in pressure within cylinder 43 will cause piston 46 to move inwardly, for atmospheric air may freely enter the outer compartment of the cylinder through check valve 53 and the movement will cause clutch pedal 48 to be depressed and the clutch disengaged against the resistance of the spring, not shown, which is ordinarily used to produce clutch engagement. The engine may now be connected to driving parts, not shown, by the usual means, and accelerator pedal 20 may be depressed against the resistance of spring 24 to speed up the engine.

Depression of pedal 20 moves rod 18 to open throttle valve 16 and causes collar 37 to engage slidable member 36 and overcome the tension of spring 84 which permits spring 67 to urge sleeve 66 toward the left, as viewed in Figures 4 and 5, and close the vacuum port 62. During this movement, wire 39 is also moved toward the left and both it and spring 76 will urge valve 69 to the position shown in Figure 4, and permit atmospheric air to flow through clearance opening 85, through port 72 to the interior of sleeve 66 into cylinder 43 through opening 63 and pipe 44. Piston 46 will then move toward the right, as viewed in Figure 2, and permit clutch pedal 48 to move to engage the clutch. The initial movement of piston 46 will be quite rapid because of the large openings 56 and 57 through which the entrapped air may pass, but toward the end of the piston travel, opening 57 is covered by bearing 54 and thereafter the movement will be slower because of the reduced passage of air through the small calibrated opening 58. It is desirable to have opening 57 covered by bearing 54 at approximately the time that the friction members of the clutch (not shown) come into contact, and to thereafter engage the friction members slowly by the dash-pot action produced by small calibrated opening 58. If desired, opening 58 may be eliminated and an outlet fitting 88 provided in the closure member 52, which fitting has a passageway 89 closed by an adjustable valve 90, as shown in Figure 7.

It may be that in some cases, the atmospheric passage through the control valve 41 and pipe 44 will not be of sufficient size to permit the proper engagement of the clutch, and I prefer to incorporate a quick relief valve 59 which will introduce a large quantity of atmospheric air directly into the cylinder from a point adjacent thereto.

The operation of the quick relief valve is produced by the differential action of the pressures acting on opposite sides of piston 79. The upper end of piston 79, as before stated, is subjected to the pressure within the cylinder 43 by the pipe 82 and the lower end is subjected to the pressure within the line 44. At the instant that atmospheric pressure is directed to the cylinder 43, the pressure in the cylinder 43 remains slightly below that in the line 44, because of the frictional resistance of the conduits, and the differential in pressure on opposite sides of the piston 79 is sufficient to lift it and permit air to rush into the cylinder 78 through ports 81 and thus insure an adequate supply of atmospheric air to be delivered to the left hand side of piston 46. The quick relief valve permits the use of small pipes to the cylinder 43, and the control of the outward movement of the piston 46 may be accurately controlled by the proper selection of calibrated hole 58, or the adjustment of valve 90 in the form shown in Figure 6.

Upon closing of the throttle by means of the accelerator pedal 20, the valve will again assume the position shown in Figure 5 and vacuum will be transmitted to cylinder 43, and the clutch disengaged.

If, for any reason, it should be desirable to render the vacuum device inoperative and to manually control the clutch by means of pedal 83, this may be accomplished by outwardly moving hand-button 28 which will first move sliding member 36 toward the left, as viewed in Figure 1, and cause the valve to assume the position shown in Figure 4. In this position of the valve, the cylinder 43 is open to atmosphere through clearance passageway 85, opening 72, and through the interior of sleeve 66 to pipe 44 and the interior of the cylinder. No movement of throttle valve 16 is produced by the initial movement of button 28 and the hand control is not operative to actuate the throttle until slidable member 36 engages the fixed collar 38 after which continued movement of hand control button 28 will actuate throttle 16 in the ordinary manner. Any movement of rod 18 beyond that necessary to move the valve to the position of Figure 4 is readily absorbed by the flexing of steel wire member 39. Control button 28 is illustrated as one convenient means of hand control, but it is obvious that the valve linkage may also be connected to any of the well known hand throttle connections, some of which are mounted on the vehicle steering wheel (not shown).

It may readily be seen from the foregoing description that I have provided an automatic clutch which is normally controlled by the accelerator pedal to permit the vehicle to free-wheel during close position of the accelerator, and which may easily be thrown to the inoperative position by the actuation of the ordinary hand throttle lever.

While I have illustrated and described, in considerable detail, one embodiment of my invention, it is understood that this showing and description are illustrative only, and that I do not regard the invention as limited to the forms shown and described, or otherwise, except by the terms of the following claims.

I claim:

1. In a vehicle having an engine, dual controls therefor, a clutch for connecting the engine to the vehicle, a gaseous pressure device for operating the clutch by the engine, a control element having a lost motion connection with each of said engine controls and operated thereby to actuate the clutch upon movement of either of the engine controls, one of said controls acting to engage the clutch when the other control is in a position to normally disengage the clutch.

2. A vacuum control for a vehicle having an engine comprising a cylinder and a piston, a control valve for selectively connecting the cylinder to vacuum and atmospheric pressure, and means controlled by a pressure differential in the control system for venting the cylinder to atmosphere through an auxiliary orifice adjacent the cylinder when the control valve is in position to connect the cylinder to atmosphere.

3. In an automotive vehicle provided with an internal combustion engine having a carburetor and a throttle, a clutch, power means operatively connected with said clutch, a control valve for said power means, two separate manually operable control members, linkage having a lost motion connection with one of said control members and interconnecting said valve and member, and other linkage having a lost motion connection with the other of said manually operable control members and interconnecting said valve with the latter manually operable member, together with linkage interconnecting said throttle and the aforementioned linkages.

4. In an automotive vehicle provided with an internal combustion engine having a carburetor and a throttle, a clutch, power means operatively connected with said clutch, a control valve for said power means, two separate manually operable control members, linkage interconnecting said throttle, valve and each of said manually operable members, said linkage comprising lost motion connections connecting each of said manually operable members with the adjacent linkage, and also comprising a lost motion connection interconnecting said throttle with both of said manually operable control members.

5. In automotive apparatus, the combination of a free-wheeling mechanism of the vacuum operated type, an accelerator pedal, a main control valve for said vacuum mechanism operable by said accelerator pedal, and an auxiliary valve of the quick acting type connected into said vacuum mechanism and arranged to accentuate changes of pressure in the vacuum system.

6. In automotive apparatus, the combination of a motor intake, a throttle valve connected to said intake and operable to fine gradations to produce smooth variations in the suction pressure in said intake, a free-wheeling control valve connected to said intake so as to be exposed to said variations in suction pressure, a vacuum operated free-wheeling device connected to said control valve, means for opening and closing said control valve so that the free-wheeling device may be operated by the suction in said intake, and a quick-acting auxiliary valve adapted to accentuate variations in pressure in the vacuum operating the free-wheeling device.

VICTOR W. KLIESRATH.